Sept. 1, 1964 V. MORRILL, JR 3,146,620
MEASURING APPARATUS FOR PIPETTES
Filed Sept. 12, 1962 2 Sheets-Sheet 1

INVENTOR.
VAUGHAN MORRILL, JR.
BY
Kane, Dalsimer and Kane
ATTORNEYS

Sept. 1, 1964  V. MORRILL, JR  3,146,620
MEASURING APPARATUS FOR PIPETTES
Filed Sept. 12, 1962  2 Sheets-Sheet 2

INVENTOR.
VAUGHAN MORRILL, JR.
BY
Kane, Dalsimer and Kane
ATTORNEYS

United States Patent Office 3,146,620
Patented Sept. 1, 1964

3,146,620
MEASURING APPARATUS FOR PIPETTES
Vaughan Morrill, Jr., 26 S. Spoede Road,
Creve Coeur, Mo.
Filed Sept. 12, 1962, Ser. No. 223,175
4 Claims. (Cl. 73—149)

This invention relates to an improved apparatus for the establishment or confirmation of volumetric ratio capacities involving the parts of an instrument such as a blood pipette.

It is a primary object to furnish a novel and readily operated mechanism by which the volumetric capacities and the ratio of the capillary and bulb or chamber portions of a pipette may be readily determined.

Still another object is that of providing a relatively simple assembly capable of being economically manufactured and operated, without special skills being necessary, for long periods of time.

With these and other objects in mind, reference is had to the attached sheets of drawings, illustrating a practical embodiment of the invention and in which.

Figure 2:
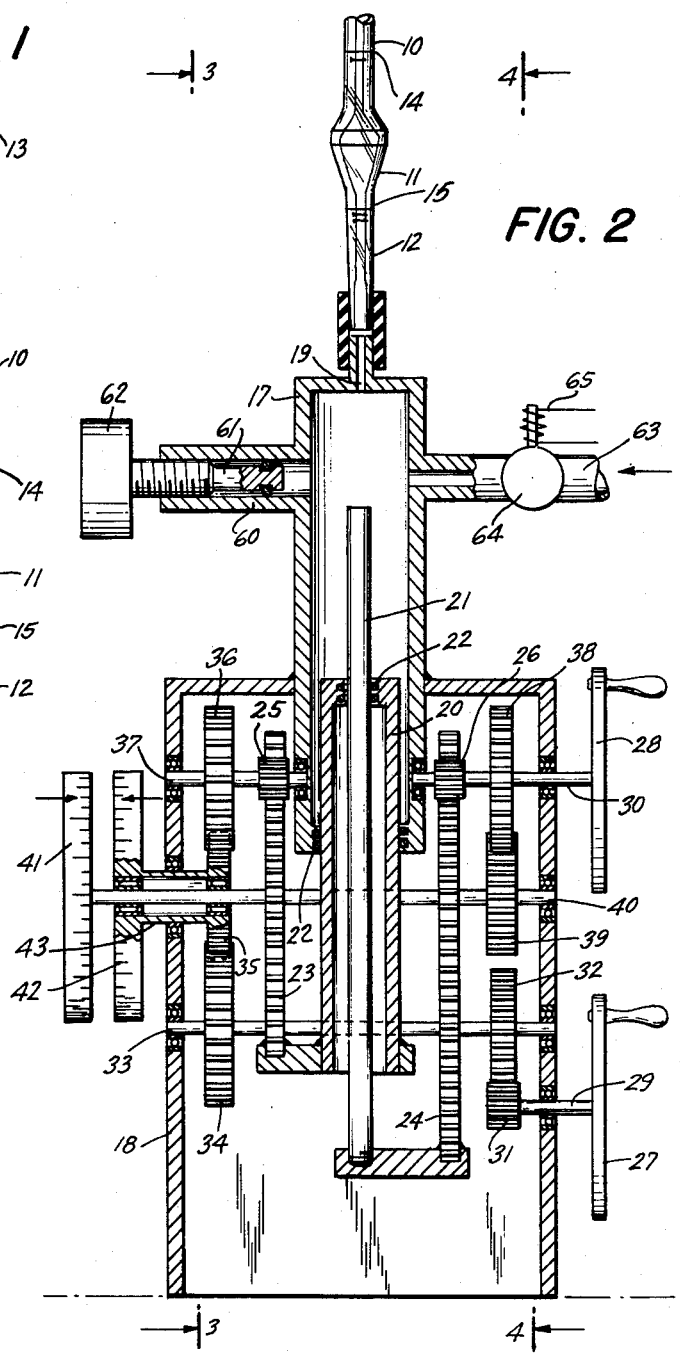
FIG. 2 is a sectional front view of a mechanism in somewhat schematic form embodying the present teachings.
Figure 3:
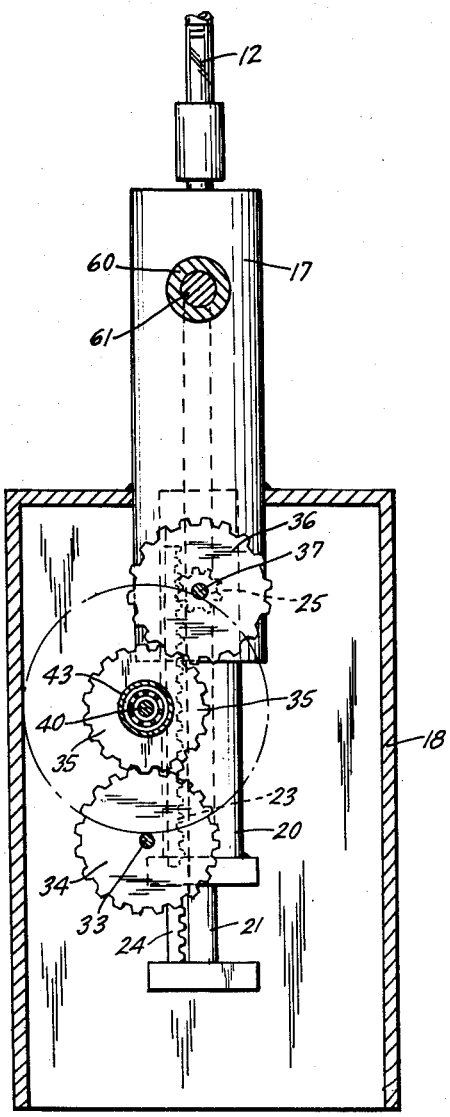
Figure 4:
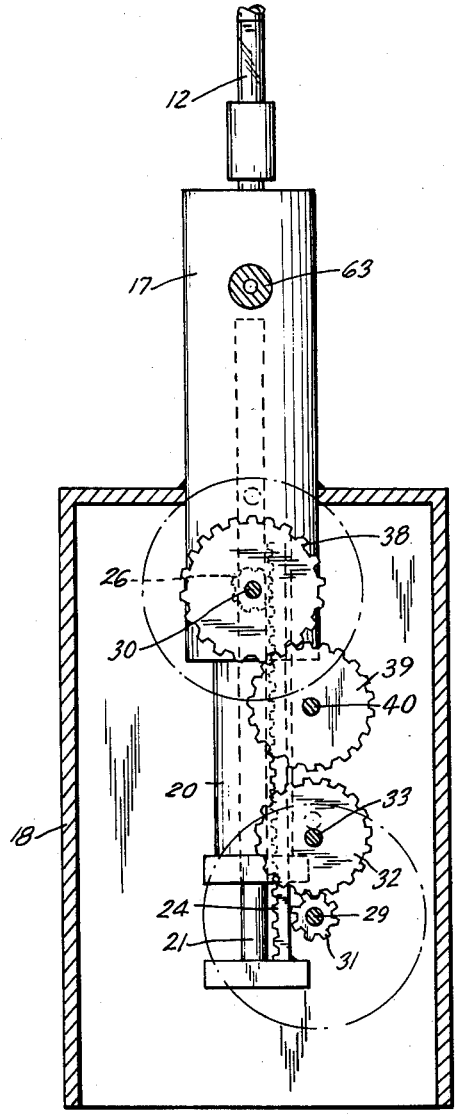

FIGS. 3 and 4 are sectional side views taken respectively along the lines 3—3 and 4—4 in the direction of the arrows as indicated in FIG. 2.

Figure 1:
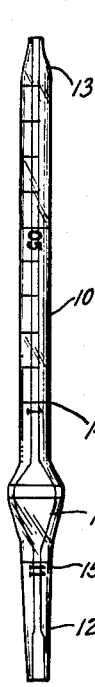
FIG. 1 is a side elevation of a pipette representative of an instrument which may be accurately calibrated through the use of the present apparatus.

Referring primarily to FIG. 1, a blood-diluting pipette has been shown. As such, it includes a capillary tube 10 continued in the form of a mixing bulb 11. Beyond the latter, is an air-withdrawal or aspirating tube 12. The outer end of the capillary tube 10 may, in accordance with conventional practice, be reduced as indicated at 13. Within the mixing chamber defined by bulb 11 a pellet may be disposed.

As is well understood by those familiar with pipettes of this type, indicating marks for the guidance of the technician must be provided so that he will be able to establish a precise ratio between a predetermined quantity of blood and a volume of diluent. Only under these conditions may an accurate cell determination be attempted. In the case of a red cell count, a different volumetric ratio between diluent and blood will exist than in the case of a white cell count. The present apparatus is primarily directed for use with and will have its functions exemplified in connection with such a blood dilution pipette to permit of the calibration of the instrument by including a mark such as 14 adjacent the inner end of the capillary tube and indicia such as an indicating mark 15 related to the bulb diluent capacity.

Thus, as in FIGS. 2 to 4, a housing 17 providing a cylinder is conveniently mounted upon a support 18 and is formed with an outlet 19. Adjacent the latter, a suitable fitting structure, such as a rubber tube is furnished so that the end portion of a pipette or an equivalent part of some corresponding instrument may be readily coupled in fluid tight relationship to the outlet. Cylinder 17 contains fluid and has associated with it, mechanism for accurately displacing predetermined volumes of liquid from its interior. As shown, this mechanism may include a piston 20 having a bore through which a smaller diameter piston 21 extends. Both of these pistons are projectable within the cylinder and movable independently of each other. Also, fluid tight seals 22 of any proper design are interposed between these pistons, as well as between housing 17 and pistons 20.

In the case of measuring apparatus employed in connection with the establishment or determination of volumetric ratio capacities between the capillary and bulb portions of pipettes having conventional dimensions, piston 20 may embrace a diameter of approximately .100″. Piston 21 would accordingly have a diameter of .020″. For clarity of illustration the size of these and other parts have been exaggerated. Mechanisms for reciprocating the pistons are conveniently furnished by racks 23 and 24, coupled at their lower ends to the adjacent ends of pistons 20 and 21, respectively. Pinions 25 and 26 have their teeth in mesh with the teeth of racks 23 and 24. Accordingly, when these pinions are rotated in one and another direction the pistons will be correspondingly moved.

To achieve this result, cranks 27 and 28 may be mounted upon shafts 29 and 30 beyond the support 18. Shaft 29 mounts a gear 31 meshing with the teeth of a gear 32 carried by a shaft 33. A further gear 34 is also carried by this shaft and has its teeth drivingly engaging the teeth of a gear 35. The latter, in turn, drives a gear 36 mounted upon a shaft 37 turning with the latter to also rotate pinion 25 and accordingly reciprocate rack 23. Pinion 26 driving rack 24 is secured to shaft 30. Obviously, the pistons will displace precise volumes of liquid when moved in one direction and when moved in an opposite direction will withdraw the liquid from the instrument. As will be understood, the operating means for projecting and retracting pistons 20 and 21, as just described, may involve different gearing arrangements or other drives; the illustrated embodiment being representative of one form of mechanism provided for this purpose.

There will be incorporated in the apparatus a registering mechanism showing the volumetric ratio of liquid displaceable by the pistons or other movable structures. Thus, in the present mechanism a gear 38 is mounted by a shaft 30 to turn with the same. Its teeth mesh with a gear 39 secured to shaft 40. The latter extends through the supporting structure and mounts at its end a dial in the form of a drum 41. A second dial, also conveniently in the form of a drum 42 is mounted by the supporting structure 18 through having secured to it a hub 43. This extends inwardly of the mounting and supports gear 35. Both of the drums present indicia related to the volume of liquid displaced by each of the pistons. Drum 41 is thus coupled to move with piston 21, while drum 42 is similarly coupled with piston 20. As shown, suitable antifriction bearings support the several shafts, the hub 43 and the drum 41.

As shown in FIG. 2 housing 17 is also preferably provided with a side chamber 60 having a head portion formed with an opening. Extending through this opening is a piston rod 61 having at its outer end an element by means of which it may be reciprocated. That element is preferably a hand wheel 62. Screw threads couple the piston and chamber head so that upon the former being rotated it will be projected into or withdrawn from the chamber 60. Thus, there is again provided a fluid displacement mechanism embracing a piston and cylinder assembly. While in many respects such an assembly is preferred, it is apparent that in the case of this side chamber as well as the housing and piston structures under numbers 17, 20 and 21, functionally equivalent fluid-displacement mechanisms might be employed.

It will be necessary to periodically compensate for loss of measuring fluid. Such losses occur because of discharge of the fluid beyond an instrument associated with the machine. Also, even where no spillage is present the filling of the instrument bore with measuring fluid and the subsequent withdrawal thereof from the bore, results in a fluid film adhering to the instrument surfaces. Consequently, if the fluid is not replenished to a proper level the apparatus will not function with accuracy.

Therefore, as in FIG. 2 a tube 63 may connect chamber 17 with a source of measuring fluid. A valve 64 conveniently operated by a solenoid 65 governs the flow through tube 63. The circuit through the solenoid may be under the control of an operator, or may automatically open and close according to the volume and height of liquid within the apparatus. In this manner a proper liquid level and volume is maintained.

In the use of an apparatus such as the foregoing, and with an instrument such as a pipette to be calibrated, the piston rod 61 may be retracted and pistons 20 and 21 similarly withdrawn. This condition is conveniently registered by the dials 41 and 42 through using a mark or pointer which is fixed and which is traversed by the indicia on the drums or equivalents as the latter move. Any suitable stop mechanism may be furnished for establishing an initial position of the parts. For example, the last operative tooth in each rack 23 and 24 may be succeeded by a larger tooth to prevent an overrunning of this zero position. It will be assumed that the pipette has heretofore received marks such as 14 and 15; also any desired indicia related to such marks. Accordingly, the accuracy of the ratio established by these marks, is to be determined.

Thus, the aspirating tube portion 12 of the pipette will be applied, in sealed relationship, to the surface defining outlet 19, as shown in FIG. 2. Thereafter, piston 61 (providing an initial "set") is projected to displace liquid through outlet 19 and fill the bore of portion 12 to the level of mark 15. Piston 20 is now projected to fill bulb 11 and thus determine the liquid volume necessary to fill the pipette to mark 14. The volume so displaced is registered by the indicia on drum 42. Thereafter, piston 20 will not be further projected. Rather, piston 21 will be projected to displace liquid through the capillary bore of the pipette. This displacement will continue until the register provided by drum 41 shows that an additional amount of liquid has been discharged to establish, in relation to the volume initially discharged, by projection of piston 20, a precisely desired ratio. Under these conditions the liquid level should be in line with the outer end of capillary tube 10. If such a condition is not present then beyond allowable variables the pipette is not acceptable.

It is apparent that while other liquid displacing units could be employed it is preferable to use pistons, as shown. By such use high magnification of motion is assured resulting in accurate ratio determination and proper evaluation of a pipette. Also, by the telescopic relationship of the pistons an economical and compact structure results. If it were desired to employ motor rather than manual drives (and with or without sequentially and automatically operating controls) this could readily be resorted to. Finally, it will be appreciated that the apparatus could be used to provide for the establishment of proper markings furnishing an accurate volumetric ratio between the mixing chamber and capillary portions of a pipette rather than determining the location accuracy of those markings.

Thus, among others, the several objects of the invention as specifically aforenoted are achieved. Obviously, numerous changes in construction and rearrangement of the parts may be resorted to without departing from the spirit of the invention as defined by the claims.

I claim:

1. A measuring apparatus including in combination a liquid-containing housing having an outlet for connection with the bore of a pipette embracing connected capillary, bulb and aspirating tube portions, a plurality of liquid displacing units connected to said housing, means for separately moving said units to transfer liquid from the latter to the pipette bore, means for registering the volumes of the liquid so transferred and a further liquid displacing unit to initially charge the bore of said aspirating portion with liquid.

2. A measuring apparatus as defined in claim 1 having means for introducing additional liquid within said housing for maintaining a predetermined volume of liquid within said housing prior to moving said liquid displacing units.

3. A measuring apparatus including in combination a liquid-containing housing having an outlet for connection with the bore of a pipette embracing connected capillary and bulb portions, a plurality of liquid displacing units in the form of telescopically related pistons projectable into said housing for thus displacing liquid through the said outlet, means for moving said units to transfer liquid from the latter to the pipette bore and for withdrawing such liquid from that bore and means for registering the volumetric ratio of the liquid so transferred.

4. A measuring apparatus for measuring the relative capacities of the bulb and capillary portions of the bore of a pipette comprising: a liquid-containing housing having an outlet for connection with the bore of a pipette to be measured, a plurality of liquid displacing units in the form of separate pistons of different diameters mounted so as to be projectable into said housing for thus displacing liquid through the said outlet, separate operating means for separately projecting said pistons into said housing to transfer liquid from the housing to the bore of a pipette connected thereto, and separate registering means connected to each of said operating means for separately registering the volume of liquid displaced by each of said pistons.

References Cited in the file of this patent

UNITED STATES PATENTS

| 2,327,642 | Horner | Aug. 24, 1943 |
| 2,736,463 | Levine | Feb. 28, 1956 |

OTHER REFERENCES

Wiegand et al.: "Simple Versatile Volumeter," The Review of Scientific Instruments, vol. 31, No. 11, November 1960, pp. 1234 to 1237.